United States Patent
Adapathya et al.

(10) Patent No.: US 7,528,718 B2
(45) Date of Patent: May 5, 2009

(54) SYSTEM AND METHOD FOR IMPROVED THEFT PREVENTION OF A NOTEBOOK COMPUTER BASED ON PRE-RESUMING ACTIVITIES

(75) Inventors: Ravi Shankarnarayan Adapathya, Cary, NC (US); Ratan Ray, Cary, NC (US); Aaron M. Stewart, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 425 days.

(21) Appl. No.: 11/537,266

(22) Filed: Sep. 29, 2006

(65) Prior Publication Data

US 2008/0079576 A1     Apr. 3, 2008

(51) Int. Cl.
*G08B 13/14* (2006.01)
(52) U.S. Cl. .................... 340/571; 340/541; 340/539.1; 340/539.19; 340/568.1; 340/825.69; 340/825.72
(58) Field of Classification Search ................ 340/571, 340/568.1, 539.1, 539.19, 541, 686.1, 825.69, 340/825.72; 235/380, 381, 383, 385; 713/200, 713/201
See application file for complete search history.

(56) References Cited

U.S. PATENT DOCUMENTS

| | | | |
|---|---|---|---|
| 6,182,223 B1 * | 1/2001 | Rawson | 726/22 |
| 7,218,226 B2 * | 5/2007 | Wehrenberg | 340/571 |
| 2002/0121976 A1 * | 9/2002 | Huang | 340/571 |

* cited by examiner

*Primary Examiner*—Hung T. Nguyen
(74) *Attorney, Agent, or Firm*—VanLeeuwen & VanLeeuwen; Carlos Munoz-Bustamante (57) ABSTRACT

A system, method, and program product that prevents theft of a portable information handling system and the intellectual property stored on the portable information handling system is provided based on pre-resuming activities that indicate that the computer has been stolen. A system and method detects whether a portable information handling system, such as a notebook computer, has likely been stolen in order to perform theft deterrence actions that render data stored on the portable information handling system inaccessible. When a user resumes a stopped portable information handling system, the system analyzes activities that occurred at the portable information handling system before the system was stopped. This analyzing includes comparing the activities to theft detection thresholds. If the theft detection thresholds have been reached, the system performs the theft deterrence actions rendering data stored at the portable information handling system inaccessible.

20 Claims, 7 Drawing Sheets

SYSTEM AND METHOD FOR IMPROVED THEFT PREVENTION OF A NOTEBOOK COMPUTER BASED ON PRE-RESUMING ACTIVITIES

BACKGROUND OF THE INVENTION

1. Technical Field

The present invention relates to a system and method that prevents theft of a notebook computer. More particularly, the present invention relates to a system and method that prevents theft of intellectual property stored on a notebook computer based upon pre-resuming activities.

2. Description of the Related Art

Portable information handling devices, such as notebook computers, are increasingly popular due to their portability and increased computer power when compared to previous generation devices. These portable information handling devices are often used by mobile professionals to conduct work away from the office environment. In addition, the increasing availability of wired and wireless networks often allows the user to connect to a network, such as the Internet or an organizations internal network, to access resources and data files.

A challenge of these devices, however, is that they are often a target for thieves due to their small size and relative high value when compared with their size. While technologies are available to help secure these portable information handling devices while working remotely, such as security cables that lock the device to a table or other relatively fixed location, these security technologies can be overcome. For example, in the case of a security cable, a thief with a bolt cutter can simply cut the security cable and walk away with the portable information handling device.

For the owner of the portable information handling system, the theft of the physical equipment is often overshadowed by the theft of the intellectual property stored on the portable information handling system. The fact that the owner of the portable information handling system does not know the ultimate motivations of the thief exacerbates the theft of the intellectual property stored on the device. For example, if the portable information handling system was being used by an engineer to design a valuable new product, or by a banker that has sensitive and confidential financial records for the bank's customers, having the engineering designs or customer financial records fall into the wrong hands could be devastating to the entire organization and might force the organization to take drastic and expensive measures to address the compromised intellectual property. For example, in the case of the banker, notices would likely have to be sent to the customers whose financial data was stolen and the bank may have to pay for losses incurred by its customers if the thief uses the stolen data to steal money from the customers using the stolen financial data.

Oftentimes, however, the thief is simply interested in the portable hardware itself and does not intend to use the intellectual property stored on the device. The thief's motivations, however, are typically unknown, and the owner of the portable information handling system often needs to assume the worst-case scenario in order to protect the organization from harm that the theft of the intellectual property could cause to the organization.

Currently, theft deterrence solutions rely on a power source in order to protect the portable hardware. For example, a battery is used to provide power to an audible alarm. Once the power source is removed, typically by removing the portable information handling system's battery, the theft deterrence of current solutions is rendered ineffective. Therefore, a system and method is needed to use pre-resuming activities in order to identify a possible theft and take appropriate actions.

SUMMARY

It has been discovered that the aforementioned challenges are resolved using a system, method and computer program product that detects whether a portable information handling system, such as a notebook computer, has likely been stolen in order to perform theft deterrence actions that render data stored on the portable information handling system inaccessible. When a user resumes a stopped portable information handling system, the system analyzes activities that occurred at the portable information handling system before the system was stopped. This analyzing includes comparing the activities to theft detection thresholds. If the theft detection thresholds have been reached, the system performs the theft deterrence actions rendering data stored at the portable information handling system inaccessible.

In one embodiment, one of the activities that is analyzed is a system movement activity. In this embodiment, before the system was stopped, a movement status of the portable information handling system was identified using a motion sensor included in the portable information handling system, and this movement status is written to a nonvolatile storage area, such as a CMOS nonvolatile memory. When the system resumes, the recorded movement status is read and if it indicates that the portable information handling system was in motion when the system was stopped the theft deterrence actions are performed.

In another embodiment, one of the activities includes writing a timestamp to a nonvolatile storage area, such as a nonvolatile CMOS memory, before the system is stopped. When the system is resumed, the timestamp is received from the nonvolatile storage area and compared to system clock's time in order to determine how long the system was stopped. This time lapse is compared to a time lapse limit in order to determine whether to set a time lapse trigger that is used to determine whether theft deterrence actions should be performed.

In one embodiment, battery data is retrieved and stored in the nonvolatile storage before the system is stopped. When the system is resumed, the battery data of the resumed system is compared to the stored battery data to determine whether the battery data has changed. This comparison is used to determine whether to set a battery trigger that is used to determine whether theft deterrence actions should be performed. In an alternate version of this embodiment, the stored battery data is compared to the battery data of the resumed system to determine whether the batteries present in the system are the same as the batteries that were in the system when it was stopped.

In another embodiment, prior to stopping the portable information handling system, theft deterrence data is received from a user and stored in the nonvolatile storage area. In this embodiment, the theft deterrence data includes a time lapse limit, a number of batteries being used by the portable information handling system, an identifier corresponding to each of the batteries, and one or more theft deterrence thresholds.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
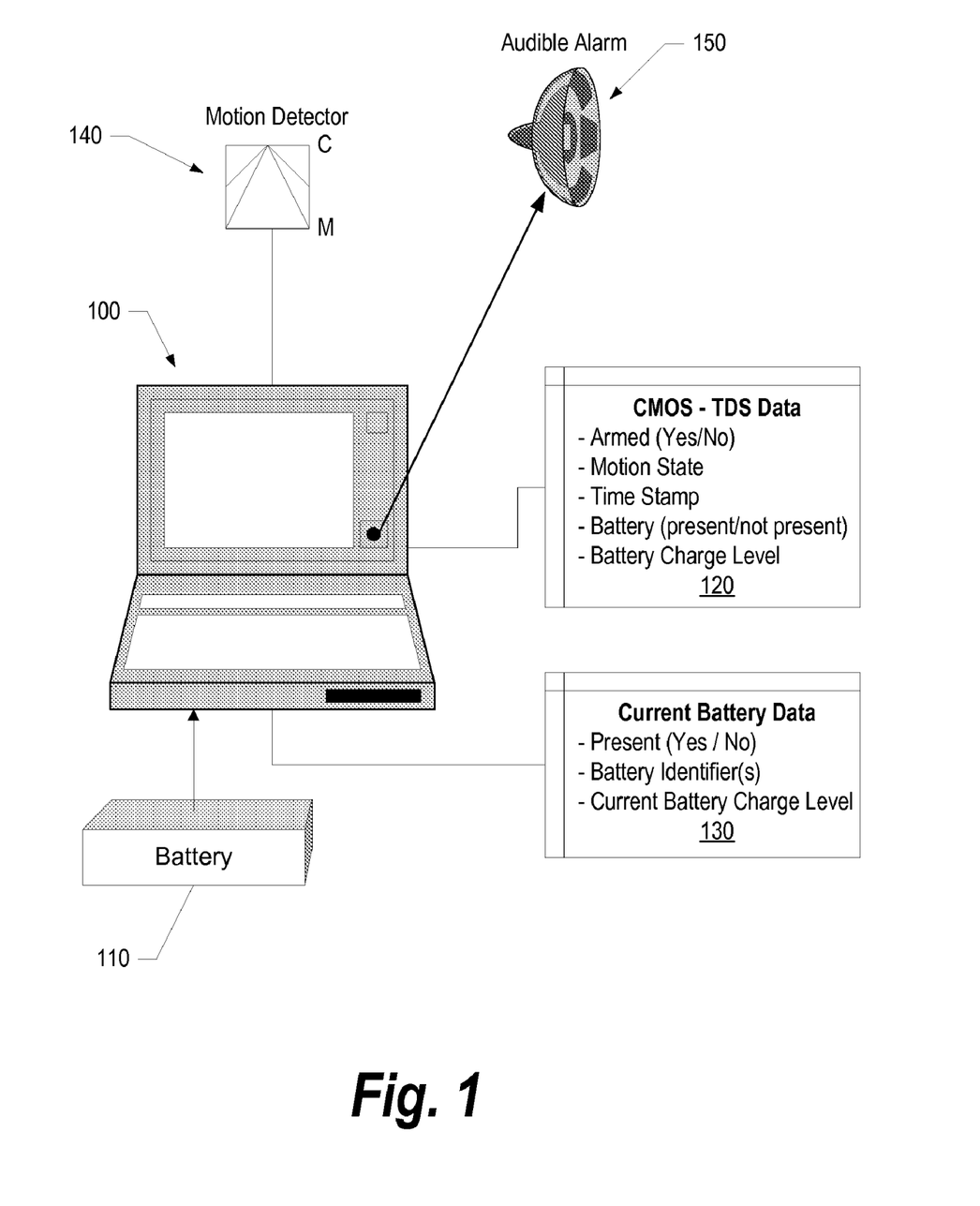
FIG. 1 is a high-level diagram showing components used in deterring theft of a notebook computer.

FIG. 1 is a high-level diagram showing components used in deterring theft of a portable information handling system, such as a notebook or laptop computer, a personal digital assistant, or the like. Portable information handling system 100 is equipped with various components that are used in deterring theft as well as components that enhance the usability of the portable information handling system. Motion detector 140 is included in the portable information handling system and senses whether the system is stationary or in motion. Battery 110 is used to provide power to the portable information handling system. Battery data is maintained by the portable information handling system and stored in a nonvolatile storage area in order to determine whether the battery has been removed or altered in an attempt to circumvent the theft detection system. Current battery data 130 reflects the current battery status of the portable information handling system. This data includes whether one or more batteries are present, battery identifications (e.g., serial numbers) corresponding to the batteries that are present, and the current charge level (i.e., amount of charge) in each of the batteries. Audible alarm 150 is used to sound an alarm if the processing described herein determine that the portable information handling system has been stolen. In addition, before the system can be used, the user is challenged with entry of login data, such as a userid/password or biometric data (e.g., a fingerprint or retina scan) before the system will operate. In one embodiment, the system writes a password to the hard drive of the portable information handling system preventing extraction and usage of the hard drive until the user of the system is verified. Because a thief will be unable to successfully authenticate himself with the portable information handling system, the hard drive will be locked with the password and the intellectual property stored on the hard drive will be inaccessible to the thief.

Nonvolatile storage area 120 is used to store various aspects concerning portable information handling system 100. In one embodiment, the nonvolatile storage area is a nonvolatile CMOS memory. As shown, the theft deterrence system (TDS) data stored in nonvolatile storage area 120 includes whether the theft deterrence system has been armed, the last motion state of the portable information handling system (e.g., "in motion," "stationary," etc.), a timestamp that is periodically written to the nonvolatile storage, and battery data such as whether one or more batteries were present and the charge level of the batteries. When the portable information handling system is resumed, the battery data stored in nonvolatile storage 120 is compared to the current battery data to identify whether the battery was removed or changed in order to attempt to thwart the theft deterrence system. The battery data can be used in conjunction with the system's motion state and timestamp. For example, if the system was "in motion" when it was last stopped, and the battery data has been changed, it might be assumed that a thief stole the portable information handling system and removed the battery in order to prevent the theft deterrence system from sounding an alarm.

Figure 2:
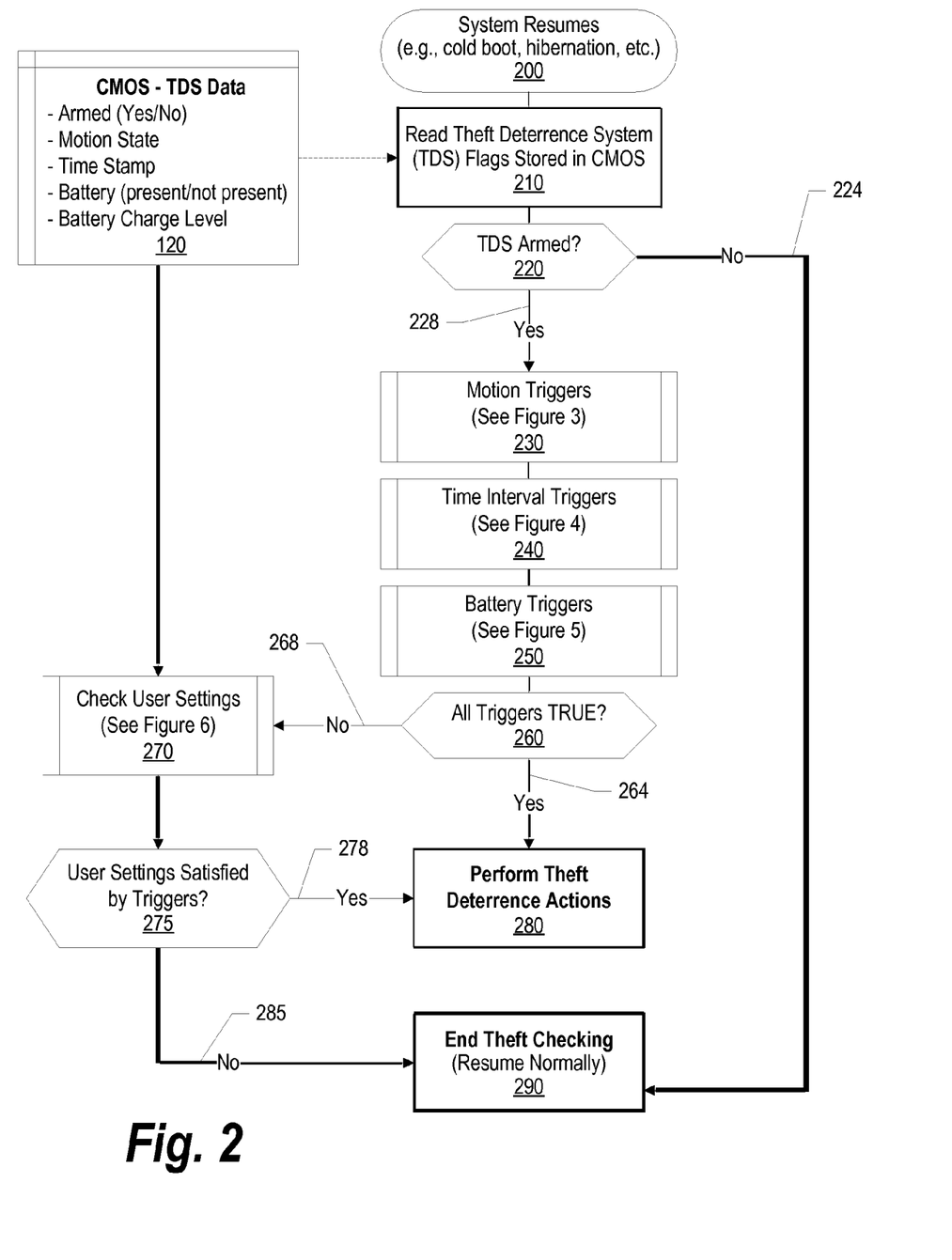
FIG. 2 is a high-level flowchart showing the steps taken when a system resumes to detect whether the computer has been stolen.

FIG. 2 is a high-level flowchart showing the steps taken when a portable information handling system resumes in order to detect whether the computer has been stolen. When the portable information handling system resumes, processing starts at 200 whereupon, at step 210, the theft deterrence system data that was last written to nonvolatile storage area 120 is read. One of the theft deterrence system settings is whether the theft deterrence system was armed by the user. When a user operates the portable information handling system in a non-secure location, the theft deterrence system should be armed by the user. A determination is made as to whether the theft deterrence system was armed (decision 220). If the theft deterrence system is not armed, then decision 220 branches to "no" branch 224 bypassing the rest of the theft deterrence operations, and theft deterrence system checking ends at step 290 with the portable information handling system resuming normally (e.g., without setting any alarms and without challenging the user for further authentication data). On the other hand, if the theft deterrence system was armed, then decision 220 branches to "yes" branch 228 in order to determine whether the portable information handling system has likely been stolen and, consequently, whether to perform theft deterrence actions, such as sounding an alarm, locking the nonvolatile storage of the system (e.g., the hard drive), and challenging the user of the portable information handling system to provide authentication data (e.g., userid/password, biometric data such as fingerprint, retina scan, etc.).

Figure 3:
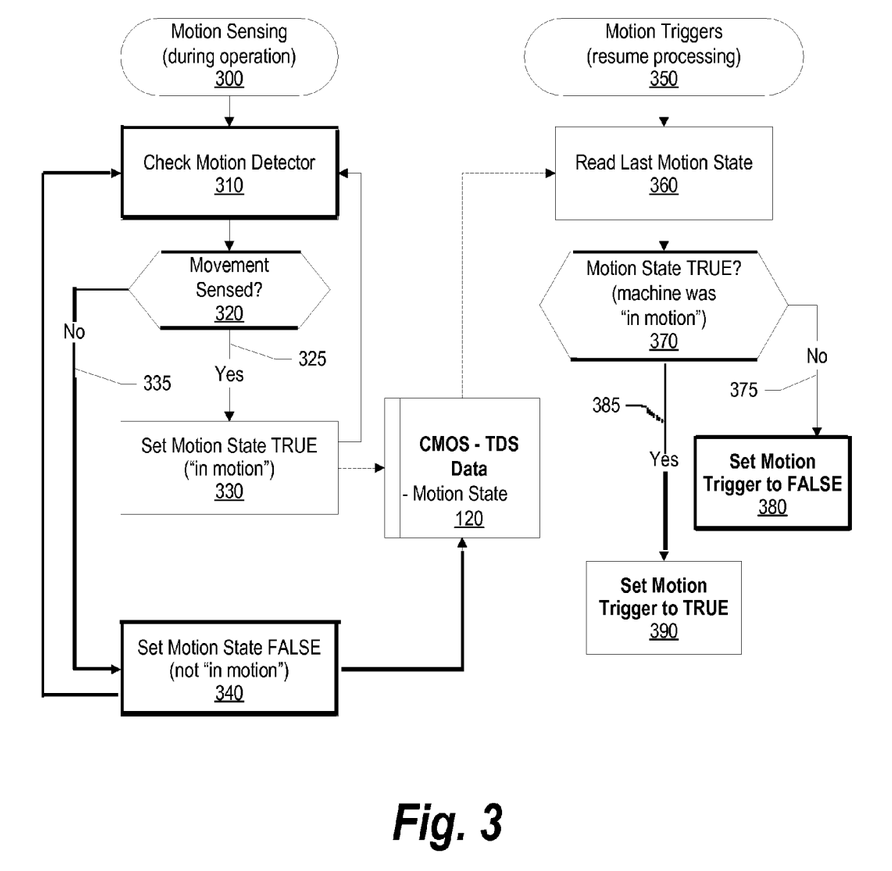
FIG. 3 is a flowchart showing the steps taken to determine if a movement trigger should be set as part of detecting whether the computer has been stolen.

Motion triggers are examined to determine whether the portable information handling system was in motion when it was stopped prior to being resumed (predefined process 230, see FIG. 3 and corresponding text for processing details). Time interval triggers are examined to identify whether the portable information handling system was inactive for a longer period of time (predefined process 240, see FIG. 4 and corresponding text for processing details). For example, if the user indicated that he uses the system every day and requested that a time interval security trigger be set if the system has not been used for a number of days (e.g., three days), then this trigger can be set. Likewise, if a thief attempts to thwart theft deterrence system measures by removing the batteries (e.g., the CMOS battery) in the system, the system date will default to an early default date that is earlier than the last timestamp written to the nonvolatile storage area and will also cause the time interval trigger to be TRUE. Battery triggers are examined to identify whether someone removed or otherwise changed one or more batteries being used by the portable information handling system (predefined process 250, see FIG. 5 and corresponding text for processing details). For example, if the system was running with one battery that had an acceptable level of charge, this trigger would be set if the battery in the system was suddenly replaced with a different battery for no apparent reason (i.e., the previous battery was not critically low on charge).

A determination is made as to whether all of the triggers (motion trigger, time interval trigger, battery trigger) are TRUE (decision 260). If all triggers are TRUE, then decision 260 branches to "yes" branch 264 whereupon, at step 280, theft deterrence system actions are performed (e.g., locking the nonvolatile storage (hard drive), challenging the user for authentication data (userid/password, biometric data, etc.), sounding an audible alarm, etc.). On the other hand, if all triggers are not set, decision 260 branches to "no" branch 268 whereupon the user's security settings are checked (predefined process 270, see FIG. 6 and corresponding text for processing details). For example, the user might decide that if a certain combination of triggers are set (e.g., the motion trigger and battery trigger are both TRUE), then theft deterrence system actions should still be taken, even though one or more triggers (e.g., the time interval trigger) has not been set. A determination is made as to whether the user's preferences (settings) are satisfied by the triggers that have been set (decision 275). If the user's settings have been satisfied, then decision 275 branches to "yes" branch 278 whereupon, at step 280, the theft deterrence system actions are performed (e.g., locking the nonvolatile storage (hard drive), challenging the user for authentication data (userid/password, biometric data, etc.), sounding an audible alarm, etc.). On the other hand, if the user's settings are not satisfied by the triggers that have been set (or if no triggers have been set), then decision 275 branches to "no" branch 285 whereupon, at step 290, the system resumes normally.

FIG. 3 is a flowchart showing the steps taken to determine if a movement trigger should be set as part of detecting whether the computer has been stolen. The motion sensing aspects commence at 300 and depict the steps taken by the system in sensing movement and recording the movement to the nonvolatile storage area prior to the system being stopped (e.g., shutdown, unplugged, hibernated, etc.). The motion triggering aspects commence at 350 and depict the steps taken by the system when resuming in order to determine whether it is likely that the system has been stolen and, consequently, whether the motion trigger should be set. Turning to motion sensing aspects, processing commences at 300 whereupon, at step 310, the system periodically checks its motion detector/sensor. A determination is made as to whether movement of the portable information handling system is sensed by the motion detector/sensor (decision 320). If movement of the portable information handling system is sensed, then decision 320 branches to "yes" branch 325 whereupon, at step 330, the motion state of the portable information handling system is set to TRUE ("in motion") and this state is stored to nonvolatile storage area 120. On the other hand, if movement is not sensed at the motion detector/sensor, then decision 320 branches to "no" branch 335 whereupon, at step 340, the motion state of the portable information handling system is set to FALSE (not "in motion", "stationary") and this state is stored to nonvolatile storage area 120. Periodically (e.g., every second, every five seconds, etc.), the system loops back to re-check the motion detector/sensor and retrieve an updated motion state that is stored to the nonvolatile storage area. In this manner, it is likely that the portable information handling system will have an "in motion" state if a thief grabs the system and disables the theft deterrence system (e.g., by removing the power source/batteries, etc.).

When the system resumes processing, the steps shown in FIG. 2 are performed and, at predefined process 230 the portable information handling system's previous motion state is retrieved by performing steps 350 to 390 shown in FIG. 3. Processing commences at 350 whereupon, at step 360, a motion trigger of the portable information handling system is retrieved from nonvolatile storage area 120. A determination is made as to whether the last motion state written to the nonvolatile storage area was TRUE ("in motion") at decision 370. If the motion state is not TRUE (FALSE), indicating that the portable information handling system was stationary or not being moved at the time the system was stopped, then decision 370 branches to "no" branch 375 and the motion trigger is set to FALSE at step 380. On the other hand, if the motion state retrieved from the nonvolatile storage area is TRUE ("in motion"), indicating that the portable information handling system was in motion at the time the system was stopped, then decision 370 branches to "yes" branch 385 and the motion trigger is set to TRUE at step 390. Processing then returns back to the calling routine (see FIG. 2).

Figure 4:
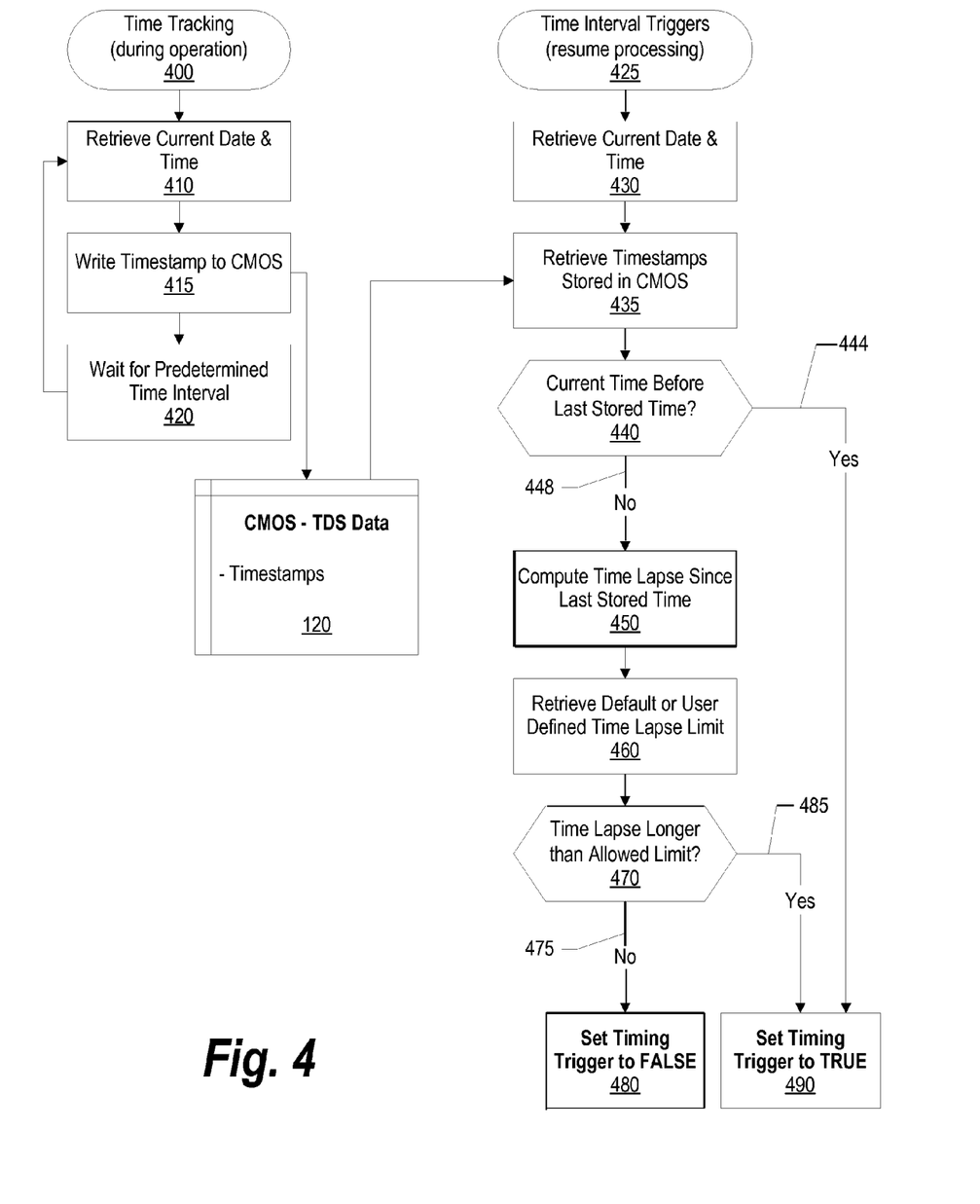
FIG. 4 is a flowchart showing the steps taken to determine if a timing trigger should be set as part of detecting whether the computer has been stolen.

FIG. 4 is a flowchart showing the steps taken to determine if a timing trigger should be set as part of detecting whether the computer has been stolen. The time tracking aspects commence at 400 and depict the steps taken by the system in tracking and recording timestamps before the system was stopped (e.g., shutdown, unplugged, hibernated, etc.). The time interval aspects commence at 425 and depict the steps taken by the system, when resuming, in order to determine whether it is likely that the system has been stolen and, consequently, whether the timing trigger should be set. Turning to time tracking aspects, processing commences at 400 whereupon, at step 410, the system periodically checks the system clock in order to retrieve the current time. At step 415, a timestamp if formed based on this time (e.g., date and time of day), and this timestamp is written to nonvolatile storage area 120. At step 420, the system waits for a predetermined amount of time (e.g., one minute, etc.) before looping back to retrieve the next time and writing the next timestamp to the nonvolatile storage area.

When the system resumes processing, the steps shown in FIG. 2 are performed and, at predefined process 240 the portable information handling system's timing trigger is determined by performing steps 425 to 490 shown in FIG. 4. Processing of these steps commences at 425 whereupon, at step 430, the current time is retrieved by checking the portable information handling system's system clock. At step 435, the last time written to nonvolatile storage area 120 is retrieved. A determination is made as to whether the current time is before the last time stored in the nonvolatile storage area (decision 440). If the current time is earlier than the last time stored in the nonvolatile storage, possibly indicating that the battery in the portable information handling system was removed and the current system clock has defaulted to an earlier date, then decision 440 branches to "yes" branch 444 whereupon, at step 490, the timing trigger is set to TRUE and processing returns to the calling routine (see FIG. 2).

Returning to decision 440, if the current time is not before the last stored timestamp retrieved from nonvolatile storage area 120, then decision 440 branches to "no" branch 448 whereupon, at step 450, the amount of time that has lapsed between the last stored timestamp and the current time is computed. At step 460, either a default or user-provided time lapse limit is retrieved. A determination is made as to whether the computed time lapse is greater than the retrieved time lapse limit (decision 470). If the computed time lapse is not greater than the retrieved time lapse limit, then decision 470 branches to "no" branch 475 whereupon, at step 480, the timing trigger is set to FALSE. On the other hand, if the computed time lapse is greater than the retrieved time lapse limit, then decision 470 branches to "yes" branch 485 whereupon, at step 490, the timing trigger is set to TRUE. After the timing trigger has been set to TRUE or FALSE, processing returns to the calling routine (see FIG. 2).

Figure 5:
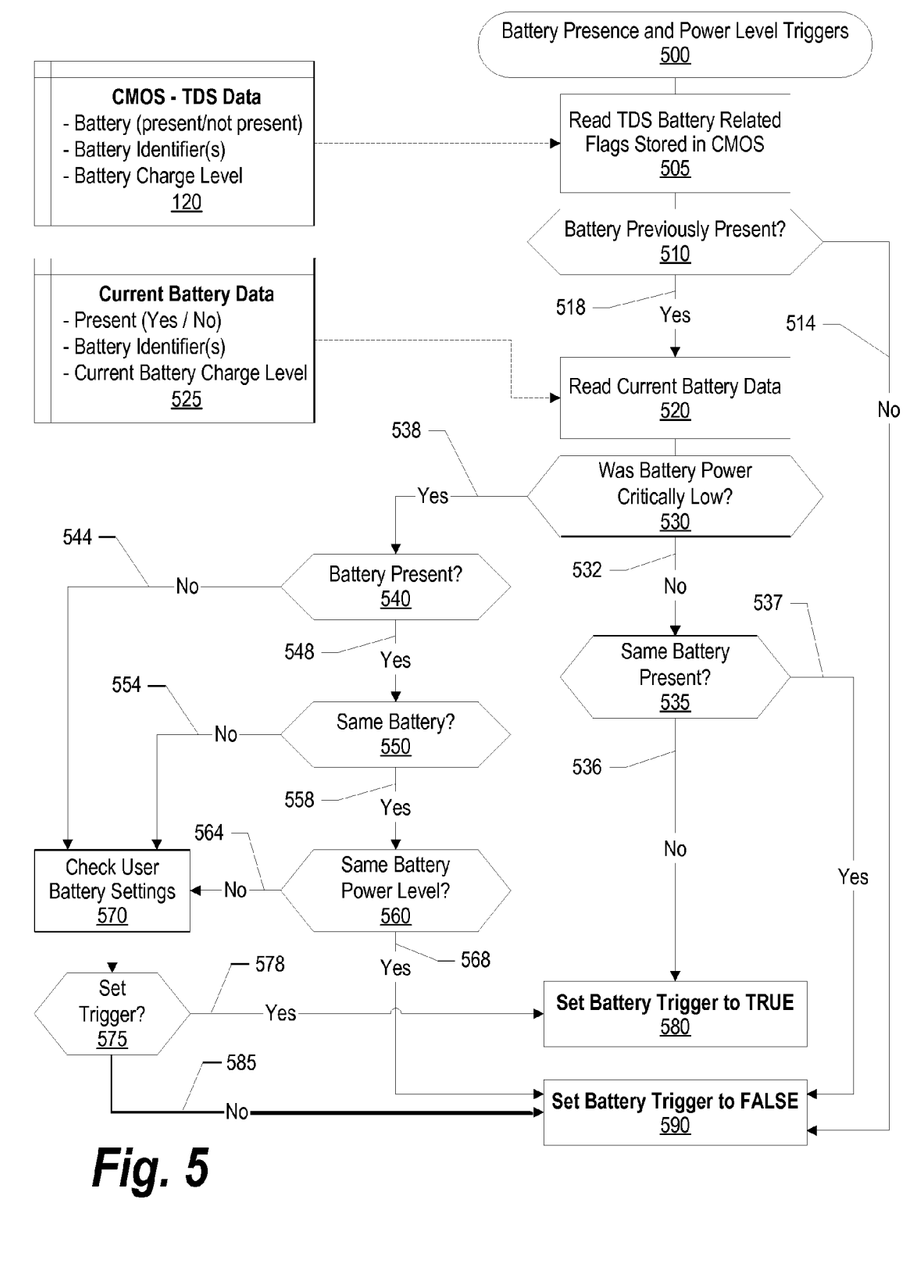
FIG. 5 is a flowchart showing the steps taken to determine if a battery trigger should be set as part of detecting whether the computer has been stolen.

FIG. 5 is a flowchart showing the steps taken to determine if a battery trigger should be set as part of detecting whether the computer has been stolen. When the system resumes processing, the steps shown in FIG. 2 are performed and, at predefined process 250 a battery trigger is set using the steps shown in FIG. 5. Processing commences at 500 whereupon, at step 505, the battery related data is read from nonvolatile storage area 120. In essence, the battery data read at step 505 reflects the battery conditions that existed at or near the time that the portable information handling system was stopped prior to being resumed. As shown, this data includes whether there were batteries present in the portable information handling system when it was stopped, the battery identifier(s) (e.g., serial numbers, charge capacities, cycle counts, etc.) for each of the batteries that were in the portable information handling system, and the charge levels that pertained to each of the batteries. A determination is made as to whether there was a battery present when the portable information handling system was stopped (decision 510). If there was no battery present, there is no battery data to analyze, so decision 510 branches to "no" branch 514 whereupon, at step 590, the battery trigger is set to FALSE and processing returns to the calling routine (see FIG. 2).

On the other hand, if at least one battery was present in the portable information handling system when it was stopped, then decision 510 branches to "yes" branch 518 whereupon, at step 520, the portable information handling system's current battery data is retrieved from one or more battery data areas, such as battery data area 525. As shown, the battery data for the current state of the portable information handling system includes whether at least one battery is present, identifier(s) corresponding to the batteries that are present, and the current charge levels of each of the batteries that are present in the portable information handling system. A determination is made as to whether battery power for the portable information handling system was critically low at the time the system was stopped (decision 530). If battery power was not critically low (e.g., based on comparison to a predefined threshold such as five percent of power remaining), then decision 530 branches to "no" branch 532 whereupon, another determination is made as to whether the same battery (or batteries) is/are present in the portable information handling system (decision 535). If the same batteries are not present it may indicate that the portable information handling system was stopped abruptly for a malfeasant purpose (i.e., someone stole the system), so decision 535 branches to "no" branch 536 and the battery trigger is set to TRUE at step 580. On the other hand, if the same battery (or batteries) is/are present, there is no cause for alarm with respect to the battery configuration and decision 535 branches to "yes" branch 537 whereupon, at step 590, the battery trigger is set to FALSE. After the battery trigger has been set, processing returns to the calling routine (see FIG. 2).

Returning to decision 530, if the battery power at the portable information handling system was critically low at the time the system was stopped, the critically low power may be the reason for the abrupt stoppage of the system. In this case, decision 530 branches to "yes" branch 538 whereupon another determination is made as to whether a battery is currently present in the information handling system (decision 540). If a battery is not currently present in the portable information handling system, decision 540 branches to "no" branch 544 whereupon the user settings are checked at step 570 to determine if this is an abnormal situation. For example, the user could have indicated that he has an external battery charger that is sometimes used to recharge the batteries, in which case the fact that the battery has been removed would not cause alarm. Returning to decision 540, if at least one battery is present, decision 540 branches to "yes" branch 548 whereupon another determination is made as to whether the battery (or batteries) currently in the portable information handling system are the same as the battery (or batteries) that were present in the system when it was stopped (decision 550). This decision can be made by comparing the battery identifiers (e.g., the serial numbers). If the battery (or batteries) are not the same, then decision 550 branches to "no" branch 554 whereupon the user settings are checked at step 570. For example, the user might have indicated that he uses multiple batteries in the system and swaps out low batteries for charged batteries, so the fact that the batteries have changed would not cause alarm. On the other hand, if the batteries are the same, then decision 550 branches to "yes" branch 558 whereupon another determination is made as to whether the batteries still have the same critically low power levels (decision 560). If the batteries do not have the same power levels, then decision 560 branches to "no" branch 564 to check user settings. For example, the user might indicate that he charges the batteries using an external charger or that he charges the batteries when the system is powered off, in which cases the fact that the power level has changed would not cause alarm. On the other hand, if the battery (or batteries) have the same power levels, then decision 560 branches to "yes" branch 568 whereupon the battery trigger is set to FALSE at step 590.

Returning to the check user settings step (step 570), the result of checking the user settings reveals whether an abnormal battery situation has occurred. Based upon this check a determination is made as to whether to set the battery trigger (decision 575). If the checks reveal a possible battery problem that might indicate that the system has been stolen, then decision 575 branches to "yes" branch 578 whereupon the battery trigger is set to TRUE at step 580. On the other hand, if checking the user settings does not reveal a possible battery problem, then decision 575 branches to "no" branch 585 whereupon, at step 590, the battery trigger is set to TRUE. After the battery trigger has been set to either TRUE or FALSE, processing returns to the calling routine (see FIG. 2).

Figure 6:
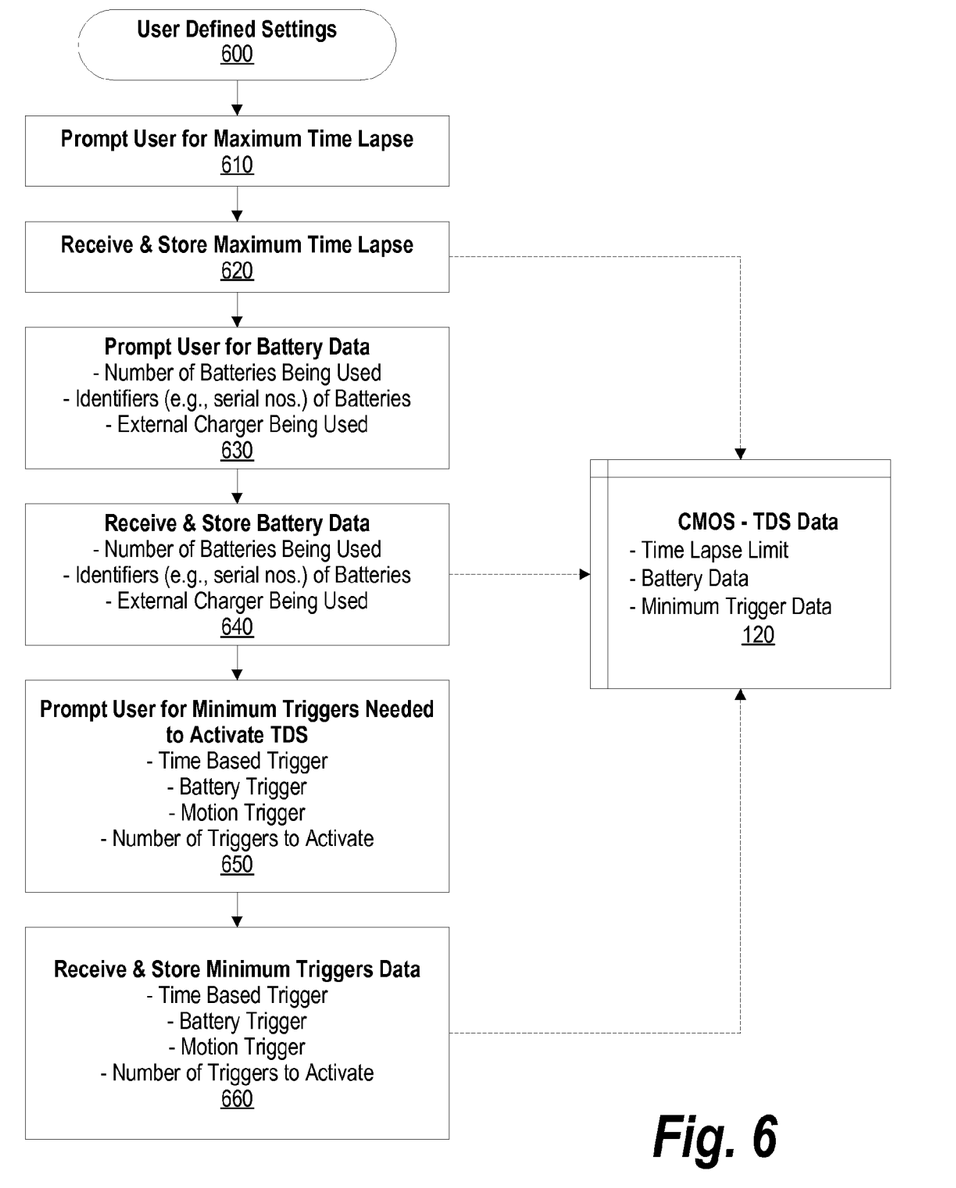
FIG. 6 is a flowchart showing the steps taken by a user of the computer system to establish user defined settings used to determine if the computer has been stolen.

FIG. 6 is a flowchart showing the steps taken by a user of the computer system to establish user defined settings used to determine if the computer has been stolen. Processing to capture user defined settings commences at 600 whereupon, at step 610 the user is prompted for the maximum amount of time lapse that is permitted (e.g., three days, etc.). This value is stored in nonvolatile storage area 120 at step 620. The user is prompted for various battery related data at step 630. Examples of battery data provided by the user include the number of batteries that are used with the portable information handling system, the identifiers (e.g., serial numbers) corresponding to each of the batteries, and whether an external charger is used to charge the batteries. This data is received and stored in the nonvolatile storage area at step 640. At step 650, the user is prompted for minimum triggers that are needed to activate the theft deterrence system. Here, the user provides which individual or combinations of triggers are needed to activate the theft deterrence system. For example, the user might indicate that he never stops the system when the system is in motion, so the single movement trigger, if set to TRUE, will cause the system to activate the theft deterrence system when it resumes. This data is received and stored in the nonvolatile storage area at step 660. Processing used to receive and store user defined settings thereafter ends.

Figure 7:
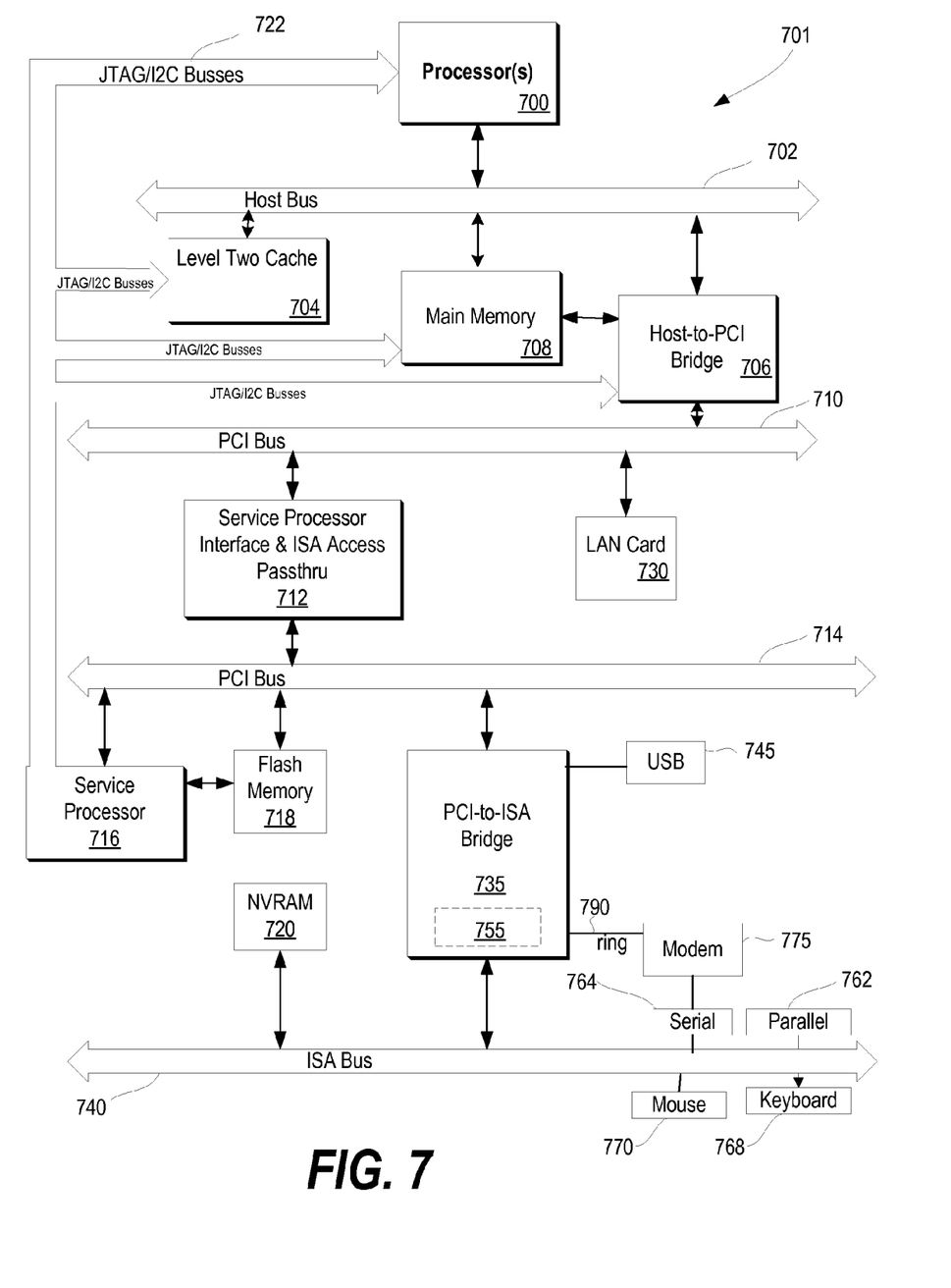
FIG. 7 is a block diagram of a data processing system in which the methods described herein can be implemented.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   resuming a stopped portable information handling system, the resuming including:
      retrieving, from a nonvolatile storage area, one or more activities that occurred at the portable information handling system before the system was stopped;
      analyzing the retrieved activities, the analyzing including comparing the activities to one or more theft detection thresholds; and
      determining whether to perform one or more theft deterrence actions based on the comparisons; and
   performing the theft deterrence actions in response to the determination, wherein the performance of the theft deterrence actions render data stored at the portable information handling system inaccessible until a user of the portable information handling system is authenticated.

2. The method of claim 1 wherein one of the activities is a system movement activity, the method further comprising:

prior to stopping the portable information handling system:
    identifying a movement status of the portable information handling system using a motion sensor included in the portable information handling system; and
    recording the movement status in a nonvolatile storage area accessible to the portable information handling system, wherein the movement status indicates that the portable information handling system is in motion; and
wherein the analyzing further includes:
    reading the recorded movement status that indicates whether the portable information handling system was in motion when the system was stopped.

3. The method of claim 1 further comprising:
prior to stopping the portable information handling system:
    writing a timestamp to a nonvolatile storage area accessible to the portable information handling system, wherein the timestamp corresponds to a first time before the system was stopped; and
wherein the analyzing further includes:
    retrieving the first time from the nonvolatile storage area and a current time from a system clock, the current time indicating a second time when the system was resumed;
    computing a time lapse between the first time and the second time;
    comparing the time lapse to a time lapse limit; and
    determining whether to set a time lapse trigger in response to the comparison.

4. The method of claim 3 further comprising:
setting the time lapse trigger in response to the second time being before the first time.

5. The method of claim 1 further comprising:
prior to stopping the portable information handling system:
    retrieving a first set of battery data that corresponds to one or more batteries used to power the portable information handling system prior to stopping the portable information handling system; and
    writing the first set of battery data to a nonvolatile storage area accessible to the portable information handling system; and
wherein the analyzing further includes:
    retrieving the first set of battery data from the nonvolatile storage area;
    retrieving a second set of battery data that corresponds to one or more batteries used to power the portable information handling system after resuming the portable information handling system;
    comparing the first set of battery data to the second set of battery data; and
    determining whether to set a battery trigger in response to the comparison.

6. The method of claim 5 further comprising:
comparing the first set of battery data and the second set of battery data to determine whether the one or more batteries used to power the portable information handling system prior to stopping the system are the same as the one or more batteries used to power the portable information handling system after the resuming; and
setting the battery trigger in response to the comparison revealing different batteries in the first and second sets of battery data.

7. The method of claim 5 wherein the comparing further comprises:
matching a first set of one or more battery identifiers retrieved from the nonvolatile storage area with a second set of one or more battery identifiers corresponding to the one or more batteries used to power the portable information handling system after the resuming; and
setting the battery trigger in response to the matching revealing different battery identifiers in the first and second set of battery identifiers and in response to determining that none of the batteries was in a low power state when the portable information handling system was stopped.

8. The method of claim 1 further comprising:
prior to stopping the portable information handling system, receiving from a user the theft deterrence data, wherein the theft deterrence data include a time lapse limit, a number of batteries being used by the portable information handling system, an identifier corresponding to each of the batteries, and the theft deterrence thresholds; and
storing the theft deterrence data in the nonvolatile storage area.

9. The method of claim 8 further comprising:
prior to stopping the portable information handling system:
    identifying a movement status of the portable information handling system using a motion sensor included in the portable information handling system;
    recording the movement status in a nonvolatile storage area accessible to the portable information handling system, wherein the movement status indicates whether the portable information handling system is in motion;
    writing a timestamp to a nonvolatile storage area accessible to the portable information handling system, wherein the timestamp corresponds to a first time before the system was stopped;
    retrieving a first set of battery data that corresponds to one or more batteries used to power the portable information handling system prior to stopping the portable information handling system, wherein the first set of battery data includes a number of batteries being used at the portable information handling system when the system was stopped and an identifier for each of the batteries being used at the portable information handling system when the system was stopped; and
    writing the first set of battery data to the nonvolatile storage area; and
wherein the analyzing further includes:
    reading the recorded movement status that indicates whether the portable information handling system was in motion when the system was stopped;
    setting a movement trigger in response to the recorded movement status;
    retrieving the first time from the nonvolatile storage area and a current time from a system clock, the current time indicating a second time when the system was resumed;
    computing a time lapse between the first time and the second time;
    comparing the time lapse to the time lapse limit;
    setting a time lapse trigger in response to the computed time lapse being greater than the time lapse limit;
    retrieving the first set of battery data from the nonvolatile storage area;
    retrieving, from the nonvolatile storage area, battery theft deterrence data that includes the number of batteries being used by the portable information handling system and the identifiers corresponding to each of the batteries;
    comparing the first set of battery data with the theft deterrence data; and setting a battery trigger in response to the first set of battery data being different than the theft deterrence data; and wherein the performing of the theft deterrence actions is executed in response to comparing the movement trigger, the time lapse trigger, and the battery trigger to the stored theft deterrence thresholds.

10. A portable information handling system comprising:
one or more processors;
a memory accessible by at least one of the processors;
a nonvolatile storage area accessible by at least one of the processors;
one or more batteries that supply power to the portable information handling system;
a system clock accessible by the one or more processors, the system clock providing a time and a date;
a motion sensor accessible by at least one of the processors, the motion sensor detecting movement of the portable information handling system; and
a set of instructions stored in the memory, wherein one or more of the processors executes the set of instructions in order to perform actions of:
resuming the portable information handling system after it has been stopped, the resuming including:
retrieving, from the nonvolatile storage area, one or more activities that occurred at the portable information handling system before the system was stopped;
analyzing the retrieved activities, the analyzing including comparing the activities to one or more theft detection thresholds; and
determining whether to perform one or more theft deterrence actions based on the comparisons; and
performing the theft deterrence actions in response to the determination, wherein the performance of the theft deterrence actions render data stored at the portable information handling system inaccessible until a user of the portable information handling system is authenticated.

11. The portable information handling system of claim 10 wherein one of the activities is a system movement activity, and wherein one or more of the processors executes the set of instructions in order to perform additional actions comprising:
prior to stopping the portable information handling system:
identifying a movement status of the portable information handling system using the motion sensor; and
recording the movement status in a nonvolatile storage area accessible to the portable information handling system, wherein the movement status indicates that the portable information handling system is in motion; and
wherein the analyzing further includes:
reading the recorded movement status that indicates whether the portable information handling system was in motion when the system was stopped.

12. The portable information handling system of claim 10, wherein one or more of the processors executes the set of instructions in order to perform additional actions comprising:
prior to stopping the portable information handling system:
writing a timestamp to a nonvolatile storage area accessible to the portable information handling system, wherein the timestamp corresponds to a first time before the system was stopped; and wherein the analyzing further includes:
retrieving the first time from the nonvolatile storage area and a current time from a system clock, the current time indicating a second time when the system was resumed;
computing a time lapse between the first time and the second time;
comparing the time lapse to a time lapse limit; and
determining whether to set a time lapse trigger in response to the comparison.

13. The portable information handling system of claim 12 further, wherein one or more of the processors executes the set of instructions in order to perform additional actions comprising:
setting the time lapse trigger in response to the second time being before the first time.

14. The portable information handling system of claim 10, wherein one or more of the processors executes the set of instructions in order to perform additional actions comprising:
prior to stopping the portable information handling system:
retrieving a first set of battery data that corresponds to one or more batteries used to power the portable information handling system prior to stopping the portable information handling system; and
writing the first set of battery data to a nonvolatile storage area accessible to the portable information handling system; and
wherein the analyzing further includes:
retrieving the first set of battery data from the nonvolatile storage area;
retrieving a second set of battery data that corresponds to one or more batteries used to power the portable information handling system after resuming the portable information handling system;
comparing the first set of battery data to the second set of battery data; and
determining whether to set a battery trigger in response to the comparison.

15. The portable information handling system of claim 14, wherein one or more of the processors executes the set of instructions in order to perform additional actions comprising:
comparing the first set of battery data and the second set of battery data to determine whether the one or more batteries used to power the portable information handling system prior to stopping the system are the same as the one or more batteries used to power the portable information handling system after the resuming; and
setting the battery trigger in response to the comparison revealing different batteries in the first and second sets of battery data.

16. The portable information handling system of claim 14 wherein the comparing further comprises one or more of the processors executing the set of instructions in order to perform additional actions comprising:
matching a first set of one or more battery identifiers retrieved from the nonvolatile storage area with a second set of one or more battery identifiers corresponding to the one or more batteries used to power the portable information handling system after the resuming; and
setting the battery trigger in response to the matching revealing different battery identifiers in the first and second set of battery identifiers and in response to determining that none of the batteries was in a low power state when the portable information handling system was stopped.

17. The portable information handling system of claim 10, wherein one or more of the processors executes the set of instructions in order to perform additional actions comprising:

prior to stopping the portable information handling system, receiving from a user the theft deterrence data, wherein the theft deterrence data include a time lapse limit, a number of batteries being used by the portable information handling system, an identifier corresponding to each of the batteries, and the theft deterrence thresholds; and     storing the theft deterrence data in the nonvolatile storage area.

18. The portable information handling system of claim 17, wherein one or more of the processors executes the set of instructions in order to perform additional actions comprising:

prior to stopping the portable information handling system:

identifying a movement status of the portable information handling system using a motion sensor included in the portable information handling system;

recording the movement status in a nonvolatile storage area accessible to the portable information handling system, wherein the movement status indicates whether the portable information handling system is in motion;

writing a timestamp to a nonvolatile storage area accessible to the portable information handling system, wherein the timestamp corresponds to a first time before the system was stopped;

retrieving a first set of battery data that corresponds to one or more batteries used to power the portable information handling system prior to stopping the portable information handling system, wherein the first set of battery data includes a number of batteries being used at the portable information handling system when the system was stopped and an identifier for each of the batteries being used at the portable information handling system when the system was stopped; and         writing the first set of battery data to the nonvolatile storage area; and     wherein the analyzing further includes:

reading the recorded movement status that indicates whether the portable information handling system was in motion when the system was stopped;

setting a movement trigger in response to the recorded movement status;

retrieving the first time from the nonvolatile storage area and a current time from a system clock, the current time indicating a second time when the system was resumed;

computing a time lapse between the first time and the second time;

comparing the time lapse to the time lapse limit;

setting a time lapse trigger in response to the computed time lapse being greater than the time lapse limit;

retrieving the first set of battery data from the nonvolatile storage area;

retrieving, from the nonvolatile storage area, battery theft deterrence data that includes the number of batteries being used by the portable information handling system and the identifiers corresponding to each of the batteries;

comparing the first set of battery data with the theft deterrence data; and         setting a battery trigger in response to the first set of battery data being different than the theft deterrence data; and     wherein the performing of the theft deterrence actions is executed in response to comparing the movement trigger, the time lapse trigger, and the battery trigger to the stored theft deterrence thresholds.

19. A computer-implemented method comprising:

upon resuming of a portable information handling system, retrieving, from a nonvolatile storage area, one or more activities that occurred at the portable information handling system before the system was stopped, wherein the activities include a motion state, and a battery state;

identifying whether the retrieved motion state indicates that the portable information handling system was in motion at the time it was stopped by using a motion detector accessible by the portable information handling system;

determining whether the current battery state corresponding to the batteries used to power the portable information handling system is different from the retrieved battery state; and     performing the theft deterrence actions in response to identifying that the portable information handling system was in motion at the time the portable information handling system was stopped and in response to determining that the current battery state is different than the retrieved battery state, wherein the theft deterrence actions include:

locking the nonvolatile storage area so that data stored on the nonvolatile storage area is inaccessible;

receiving authentication data from a user of the portable information handling system; and         unlocking the nonvolatile storage area in response to verifying the authentication data.

20. The method of claim 19 further comprising:

retrieving a timestamp stored in the nonvolatile storage area prior to the portable information handling system being stopped;

retrieving a current time from a system clock included in the portable information handling system;

performing the theft deterrence actions in response to the current time being before the retrieved time;

computing a time lapse between the retrieved time and the current time; and     performing the theft deterrence actions in response to the time lapse being greater than a predetermined threshold.

* * * * *